Figure 1:
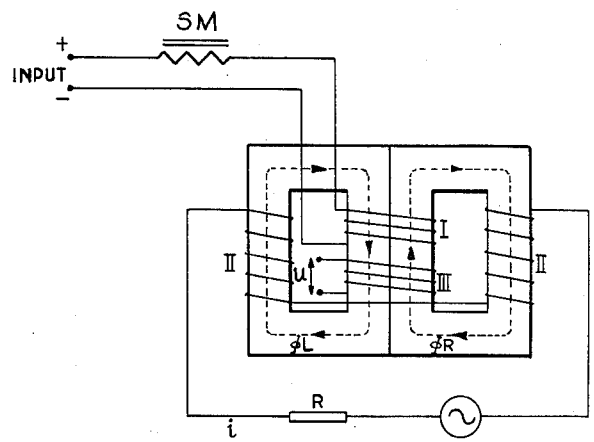

Sept. 27, 1955   S. L. BOERSMA   2,719,269
MAGNETIC MODULATORS

Filed July 27, 1951   2 Sheets-Sheet 1

Inventor:
Sipko Luu Boersma

By:
Michael S. Stroker
agt.

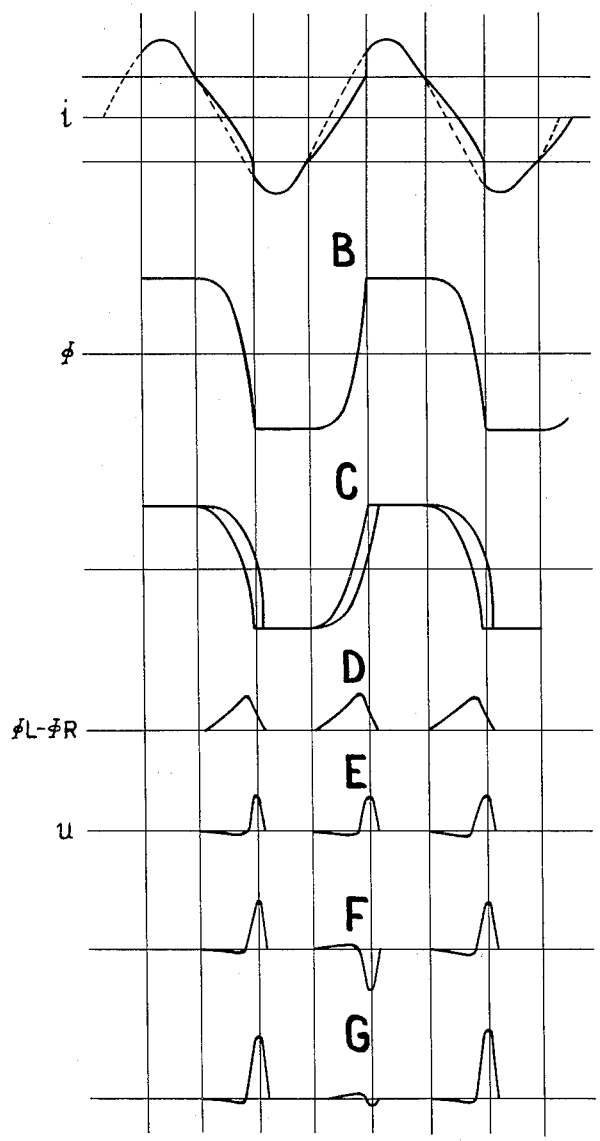

United States Patent Office 2,719,269
Patented Sept. 27, 1955

2,719,269

MAGNETIC MODULATORS

Sipko Luu Boersma, Delft, Netherlands

Application July 27, 1951, Serial No. 238,993

Claims priority, application Netherlands July 31, 1950

5 Claims. (Cl. 332—51)

My invention relates to a magnetic modulator for converting weak D. C. currents in A. C. voltages which can be amplified by means of electronic tubes, and has for its object a very simple and stable magnetic system which in many cases can replace a sensitive galvanometer and is practically free from mechanical or other disturbances or vibrations, which often restrict the use of galvanometers.

Other objects of my invention will become apparent in the following description thereof, which is preceded by a short discussion of the present state of the art.

The rather low stability of straight D. C. tube amplifiers as compared with that of A. C. amplifiers has led to the development of converters by which weak D. C. currents or voltages can be converted into A. C. voltages. An A. C. voltage of this kind can easier be amplified by means of electronic tubes than the original D. C. current. Stability and zero drift of such a device are determined principally by the converter. Already known is the mechanical chopper provided with mobile contacts which interrupt the D. C. current periodically, or bring about a reversal of its polarity. Instability is caused in this case by thermo-E. M. K.'s and contact potentials between contacts, which bring about zero drifts. This type of converter is suited for circuits with a low resistance. For high resistance circuits we know the vibrating condenser. Here, the D. C. current is connected by means of high resistance with a condenser in which the distance between electrodes can be varied periodically. An A. C. voltage, suited for amplification, produces itself between the terminals of the condenser. Here, it is the non-constant contact potential difference between the condenser's electrodes that gives rise to zero drift instability, for even if both electrodes are made of the same material, surface contamination may cause contact-potential differences. The first-mentioned converter is to be considered as a periodically variable resistance, the latter one as a variable capacity.

The present invention relates to a periodically variable self-inductance or mutual inductance. The D. C. current is sent through a coil wound on ferromagnetic material, through which an A. C. flux flows as well, strong enough to saturate periodically said material. In the D. C. coil or another coil coupled to the D. C. coil, an A. C. voltage produces itself now that consists of even multiples of the auxiliary flux's frequency. Amplitude and phase of this A. C. voltage depend on magnitude and direction of the primary D. C. current. A device of this type is known from, among other writings, German patent specification No. 646,551 and Siemens' Revue 1935, page 201. According to this German patent specification No. 646,551, the weak primary D. C. current is sent through two similar coils wound on two magnetic circuits made of ferromagnetic material. There are also coils on these cores through which flows a sinusoidal A. C. current whose magnitude is sufficient to give rise to a flux in the magnetic material that reaches saturation periodically and thus is a trapezium-shaped function of time. At the flux's zeros, voltage pulses are generated in coils on the cores suited for this purpose. In the absence of a D. C. current-magnetization, the zeros in both cores produce themselves at the same time, and, in consequence, the voltage pulses as well. Both output coils have now been connected in opposition for the A. C. voltage, so that no output voltage results. A D. C. current-magnetization that is differently directed for any of both coils makes that the zeros produce themselves at different moments. It is true that the pulses in the series-connected output coils are still similar and of opposite magnitudes, but no longer simultaneous, so that an output pulse results, consisting of equally strong positive and negative parts. Increase of the applied D. C. current brings about, in its turn, an increase of the positive as well as of the negative part; the shape of the pulse remains symmetrical with regard to the zero axis. In case of reverse of polarity of the D. C. current the positive and negative parts of the output pulse change places. An output voltage of this character is not easy to detect in such a way that in the results of detection the polarity of the input D. C. current can be maintained. In the appliance made according to the present invention this difficulty is avoided, because the positive part of the output pulse formed in this case is sharp and high, and the negative part low and protracted. Reversing the polarity of the input D. C. current the negative part becomes high and peak-shaped, and the positive part a low and broad one. Such a shape is easy to detect by means of a peak voltage detector. Appliances as described in German patent specification No. 646,551 and as referred to in the present invention can easily be distinguished from magnetic amplifiers as described in current technical literature. As for the magnetic amplifier, the input D. C. current is used to saturate an iron circuit, by which means the self-inductance of an auxiliary winding decreases. This is a non-polar effect, for both a positive and a negative D. C. current give rise to saturation. Polarity can only be reached by superimposing on the flux of the input D. C. current an auxiliary field originated by an auxiliary D. C. current. The increase or decrease of the total field depends, then, on the direction of the input D. C. current. By this, the zero stability is lower than that of the magnetic converter described here, for the converter's zero is not found on an indefinite spot on the BH curve, but in the centre of the axis' intersection. In Dutch patent specification No. 57,674, two magnetic amplifiers are connected in push pull in order to reach a symmetrical polar characteristic by making use of an auxiliary D. C. flux. However, devices according to German patent specification No. 646,551 and to the present invention are polar ones without the aid of an auxiliary flux: the output voltage changes 180 degrees in phase, reversing the polarity of the D. C. current. A second difference consists in the frequency of the output A. C. voltage: that of the magnetic amplifier equals the frequency of the auxiliary A. C. flux, that of the here described devices consists in even multiples of the auxiliary frequency.

As for the magnetic amplifier, it is the D. C. current that has to vary the permeability; that of the device in question is varied by the auxiliary D. C. current: the permeability decreases twice per period, by which means the D. C. flux, which is proportional to the permeability, will also decrease twice per period and thus obtain a double-frequency A. C. component.

The present invention relates to a magnetic converter whose output voltage consists in asymmetric pulses suited to a simple, but nevertheless polar detection. In Fig. 1, an embodiment of same has been drawn in outline. On a core made of ferromagnetic material three separate windings have been wound. Through winding No. I flows the weak D. C. current to be converted, by which means a small field is produced, turning to the left in the left circuit and to the right in the right circuit. Winding No. II is connected by means of a resistance R with an A. C. E. M. K., which brings about a strong A. C. flux whose direction is the same in both circuits, so that in the middle leg both A. C. fluxes have opposite directions. Besides coil No. I, the middle leg contains coil No. III in which are generated the voltage pulses that are suited to further amplification and detection. Fig. 2 shows the relation of the separate magnitudes to the time.

Figure 3:
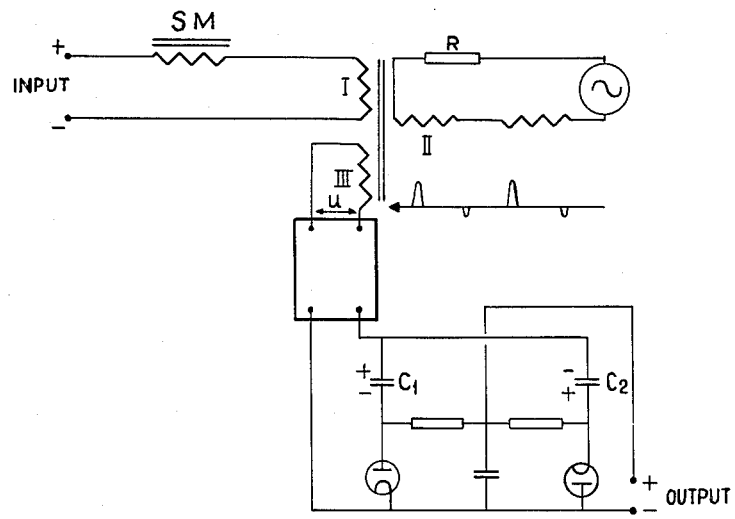

Provisionally it is assumed that no D. C. current flows through winding No. I; in that case, the left flux $\phi_L$ and the right flux $\phi_R$ equal each other ($\phi$ in Fig. 2b). In case of great momentary value of the A. C. current $i$, the core material is saturated, i. e. $\phi$ constant. The current strength $i$ necessary for this purpose is indicated in Fig. 2a by dotted lines. So $\phi$ is constant from A to B, and no induction E. M. K. can be developed in coil No. II. The total applied A. C. voltage is now applied across resistance R, by which means the phase of the current $i$ is equivalent to that of said voltage, and the current $i$ flows sinusoidally between A and B. In other words: when the core is saturated the resistance R is high as compared with the impedance of the coil II, by which means the phases of applied A. C. tension and current are equivalent. Past point A, $\phi$ will decrease, which will develop a counter-E. M. K. that will counteract this decrease. Past point A the core is no longer saturated, the impedance of coil II has become of the same order of magnitude as R. Thus, the current lags in phase during the time BC that the core remains unsaturated. In point C, the current in negative direction has grown of sufficient strength as to saturate the core again. Thus, in point C the self-inductance becomes small and the counter-E. M. K. across the coil cannot be maintained any longer, so that the current jumps all of a sudden from C to D. From D till E the flux is constant again and the current is sinusoidal. The shape of the produced flux is such that the transit from saturated to unsaturated takes place quite slowly, but, at the contrary, the transit from unsaturated to saturated is a very quick one. Such a flux shape can be obtained also by other means than using the connection of Fig. 1. The shape shown by Fig. 2 is obtained here very easily by including the resistance R in the circuit; the impedance of said resistance is comparable with the reactance of the unsaturated coil II, but is high as compared with the reactance of the saturated coil. If through the coil I flows a weak D. C. current the left flux will decrease and the right one increase during one half of a period; during the other half of a period, the left flux will increase and the right one decrease. As the height of saturation is determined by the core material this effect appears only during the unsaturated periods BC, EF etc. Left and right flux are of different shape now (viz. Fig. 2c). The flux difference enclosed by coils I and II is no longer zero but has taken the shape shown in Fig. 2d. In coils I and III the voltage $u$ (Fig. 2e) is generated, whose shape is equal to that of the first derivative of curve 2d. As a result of the asymmetrical shape of flux $\phi$ the output voltage consists of pulses which are low and broad for one part, and high and peak-shaped for the other. As the peak produces itself during the very rapid transit CD (Fig. 2a) the pulse height is great; i. e. the converter has a high voltage amplification factor (several thousands). The pulse height is directly proportional to the input D. C. current. The pulses change signs when the input D. C. current is reversed. This type of pulse is quite suited for amplification in an A. C. amplifier followed by polar detection (Fig. 3). In Fig. 3 the condenser C₁ is charged to the peak voltage of the positive pulses, C₂ to that of the negative pulses, so that the D. C. voltage originated by detection changes polarity when the positive pulses are replaced by negative ones, i. e. when the input D. C. current commutates. In case of practical application the symmetry of the magnetic circuit will never be complete, so that coil III will enclose a small A. C. field of the fundamental frequency. Just as the D. C. field, this field creates pulses which will have now, however, a high peak alternatively in positive and negative direction. In the absence of D. C. current the output voltage is no longer zero but has the shape shown in Fig. 2f. As here the positive and negative peaks are of equal height this signal does not develop any D. C. voltage in the output terminals of the detector of Fig. 3. When D. C. current is supplied to the converter, the output voltage will be composed of a superposition of voltage shape 2e and 2f, which superposition is shown by Fig. 2g. The detector of Fig. 3 now reacts with polarity to the height difference between the positive and negative peaks, which very difference is caused by the input D. C. current.

As was already observed it is not necessary for a good working of the converter to obtain the required flux shape by means of the resistance R of Fig. 1. The coil II of Fig. 1 can be connected with an A. C. generator which produces such a current shape that the developed flux takes the shape shown by Fig. 2b. Neither is it necessary to draw the output voltage from the coil III (Fig. 1). The coil encloses the same flux, so that also here a suitable output voltage produces itself, which is isolated by the choke SM of the D. C. generator. An output voltage can thus also be drawn from SM or from a second coil wound on SM, just as in German patent specification No. 646,551. The shape of the magnetic circuit can be made, too, as in said patent specification. In Fig. 1 the left and right circuits are entirely separated and each of them provided with windings of their own. Coils I and III are each to be composed, then, of two equal parts. This does not alter the shape of the developed voltage. It is also possible to apply feed back to the connections of Fig. 3. Part of the developed D. C. current can be led back to the input circuit of the converter or to an extra coil which, in that case, must be magnetically coupled with coil I.

If the converter is connected with an A. C. amplifier provided with detector and indicating instrument, a very sensitive apparatus for measuring D. C. voltages is created. Its sensitiveness, which surpasses that of a magnetic amplifier, may be compared with that of a good galvanometer. So it can be applied for measuring purposes with thermocouples, bolometers, resistance thermometers, resistance strain gages, photocells etc. As compared with the galvanometer, this apparatus has the advantage of being more solid, of indicating more quickly, of being provided with a pair of terminals from which an amplified input voltage can be drawn, enabling its application in a great number of servo-systems. In comparison with other mechanical and magnetic devices that exist for this purpose, the described converter has the advantage of having a good zero stability, of having no mobile parts, and of having a very high voltage-amplification of its own, as well as a favourable shape of the output voltage, by which means the electronic circuit to be connected with the converter, can be kept very simple.

What I claim is:

1. An apparatus for converting a direct current of small amplitude into an alternating voltage comprising, in combination, a core of magnetic material; alternating current means coupled to said core for inducing in at least a given portion thereof a first alternating flux which saturates said core twice each cycle and which changes from zero to its maximum value in either sense in a relatively short interval of time and which changes from said maximum value to zero in a relatively long interval of time, and for inducing in said given portion of said core a second alternating flux which is the inverse of said first alternating flux, whereby the resultant of said two alternating fluxes in said given portion is zero; a source of direct current which it is desired to convert to an alternating voltage coupled to said given portion of said core, the current supplied by said source producing a virtual time delay between said first and second alternating fluxes; and output means coupled to said given portion of said core for deriving therefrom an alternative voltage consisting of pulses which are induced in said output means as a result of the virtual time displacement of said first and second alternating fluxes, the magnitude and phase of said pulses being a function of the amplitude and polarity of the direct current supplied by said source of direct current.

2. An apparatus for converting a direct current of small amplitude into an alternating voltage comprising, in combination, a core of magnetic material; alternating current means comprising a source of alternating current in series with a resistor coupled to said core for inducing in at least a given portion thereof a first alternating flux which saturates said core twice each cycle and which changes from zero to its maximum value in either sense in a relatively short interval of time and which changes from said maximum value to zero in a relatively long interval of time, and for inducing in said given portion of said core a second alternating flux which is the inverse of said first alternating flux, whereby the resultant of said two alternating fluxes in said given portion is zero; a source of direct current which it is desired to convert to an alternating voltage coupled to said given portion of said core, the current supplied by said source producing a virtual time delay between said first and second alternating fluxes; and output means coupled to said given portion of said core for deriving therefrom an alternating voltage consisting of pulses which are induced in said output means as a result of the virtual time displacement of said first and second alternating fluxes, the magnitude and phase of said pulses being a function of the amplitude and polarity of the direct current supplied by said source of direct current.

3. An apparatus for converting a direct current of small amplitude into an alternating voltage comprising, in combination, a core of magnetic material; coil means wound on a portion of said core; alternating current means comprising a source of alternating current in series with a resistor coupled to said coil for inducing in at least a given portion of said core a first alternating flux which saturates said core twice each cycle and which changes from zero to its maximum value in either sense in a relatively short interval of time and which changes from said maximum value to zero in a relatively long interval of time, and for inducing in said given portion of said core a second alternating flux which is the inverse of said first alternating flux, whereby the resultant of said two alternating fluxes in said given portion is zero; a source of direct current which it is desired to convert to an alternating voltage coupled to said given portion of said core, the current supplied by said source producing a virtual time delay between said first and second alternating fluxes; and output means coupled to said given portion of said core for deriving therefrom an alternating voltage consisting of pulses which are induced in said output means as a result of the virtual time displacement of said first and second alternating fluxes, the magnitude and phase of said pulses being a function of the amplitude and polarity of the direct current supplied by said source of direct current.

4. An apparatus for converting a direct current of small amplitude into an alternating voltage comprising, in combination, a core of magnetic material; coil means wound on a portion of said core; alternating current means comprising a source of alternating current in series with a resistor coupled to said coil for inducing in at least a given portion of said core a first alternating flux which saturates said core twice each cycle and which changes from zero to its maximum value in either sense in a relatively short interval of time and which changes from said maximum value to zero in a relatively long interval of time, and for inducing in said given portion of said core a second alternating flux which is the inverse of said first alternating flux, whereby the resultant of said two alternating fluxes in said given portion is zero; a source of direct current which it is desired to convert to an alternating voltage comprising a coil wound on said given portion of said core, the current supplied by said source producing a virtual time delay between said first and second alternating fluxes; and output means coupled to said given portion of said core for deriving therefrom an alternating voltage consisting of pulses which are induced in said output means as a result of the virtual time displacement of said first and second alternating fluxes, the magnitude and phase of said pulses being a function of the amplitude and polarity of the direct current supplied by said source of direct current.

5. An apparatus for converting a direct current of small amplitude into an alternating voltage comprising, in combination, a core of magnetic material; a first coil wound on said core; alternating current means coupled to said coil and supplying an alternating current thereto of sufficient amplitude to saturate said core twice each cycle; means in circuit with said alternating current means for producing a resultant first alternating flux in a given portion of said coil which changes from zero to its saturation value in either sense in a relatively short interval of time and which changes from said saturation value to zero in a relatively long interval of time; a second coil wound on said core, said alternating current means and said means in circuit with said alternating current means being coupled to said second coil for producing a resultant second alternating flux in said given portion of said core which is the inverse of said first alternating flux, whereby the resultant of said two alternating fluxes in said given portion of said core is zero; a third coil wound on said given portion of said core; a source of direct current which it is desired to convert to an alternating voltage coupled to said third coil, the direct current supplied by said source producing a virtual time delay between said first and second alternating fluxes; and a fourth coil coupled to said given portion of said core for deriving therefrom an alternating voltage consisting of pulses having a broad part of relatively small amplitude and a narrow part of relatively high amplitude and of opposite polarity to the polarity of said first part, said pulses being induced in said fourth coil as a result of the virtual time displacement of said first and second alternating fluxes, the magnitude and phase of said pulses being a function of the amplitude and polarity of the direct current supplied by said source of direct current.

References Cited in the file of this patent

UNITED STATES PATENTS

| | | |
|---|---|---|
| 1,679,448 | Smith | Aug. 7, 1928 |
| 1,824,577 | Sorensen | Sept. 22, 1931 |
| 2,466,028 | Klemperer | Apr. 5, 1949 |
| 2,498,475 | Adams | Feb. 21, 1950 |
| 2,585,654 | Hewlett | Feb. 12, 1952 |

FOREIGN PATENTS

| | | |
|---|---|---|
| 634,196 | Great Britain | Mar. 15, 1950 |